United States Patent
Arakawa

(10) Patent No.: US 7,048,420 B2
(45) Date of Patent: May 23, 2006

(54) REAR VIEW MIRROR ASSEMBLY

(75) Inventor: Kuniaki Arakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 10/726,194

(22) Filed: Dec. 3, 2003

(65) Prior Publication Data
US 2004/0145903 A1     Jul. 29, 2004

(30) Foreign Application Priority Data
Dec. 9, 2002   (JP)   ............... 2002-356657

(51) Int. Cl.
*B60R 1/12*   (2006.01)
(52) U.S. Cl. ............... 362/494; 362/540; 362/541; 362/544; 362/545
(58) Field of Classification Search ............... 362/494, 362/476, 498, 543, 544, 545, 540, 541; 340/472, 340/475, 425.5, 463, 465
See application file for complete search history.

(56) References Cited

U.S. PATENT DOCUMENTS

| | | | | |
|---|---|---|---|---|
| 5,499,169 A | * | 3/1996 | Chen | 362/494 |
| 6,068,299 A | * | 5/2000 | Peltzer | 281/45 |
| 6,142,556 A | * | 11/2000 | Tanaka et al. | 296/146.7 |
| 6,325,517 B1 | * | 12/2001 | Kuo | 359/838 |
| 6,749,325 B1 | * | 6/2004 | Bukosky et al. | 362/494 |
| 6,769,798 B1 | * | 8/2004 | Mishimagi | 362/522 |
| 6,832,848 B1 | * | 12/2004 | Pastrick | 362/494 |
| 6,848,816 B1 | * | 2/2005 | Gilbert et al. | 362/494 |
| 6,880,960 B1 | * | 4/2005 | Mishimagi | 362/522 |
| 6,919,796 B1 | * | 7/2005 | Boddy et al. | 340/425.5 |
| 2002/0126497 A1 | * | 9/2002 | Pastrick | 362/494 |
| 2005/0190465 A1 | * | 9/2005 | Henion et al. | 359/864 |

* cited by examiner

*Primary Examiner*—Sandra O'Shea
*Assistant Examiner*—Anabel Ton
(74) *Attorney, Agent, or Firm*—Birch Stewart Kolasch & Birch LLP

(57) ABSTRACT

A turn indicator light and a position light are provided for a rear mirror assembly mounted in a vehicle body. A light body for the turn indicator light is a filament light bulb and a light body for the position light is a light emitting diode. Positioning the lights in the rear mirror permits the width of the vehicle to be more recognizable. The turn indicator light and the position light are provided with individual light bodies, respectively, for allowing independent service to be performed with respect to each light.

20 Claims, 5 Drawing Sheets

REAR VIEW MIRROR ASSEMBLY

CROSS-REFERENCE TO RELATED APPLICATIONS

The present application claims priority under 35 USC 119 to Japanese Patent Application No. 2002-356657 filed on Dec. 9, 2002 the entire contents thereof is hereby incorporated by reference.

BACKGROUND OF THE INVENTION

1. Field of the Invention

The present invention relates to a rear view mirror assembly and, more particularly, to a rear view mirror assembly having a position lamp.

2. Description of Background Art

A vehicle including a motorcycle and the like is provided with a rear view mirror used for allowing an operator of the vehicle to have a rearward vision. It is known to provide a turn indicator light in a rear view mirror. Japanese Patent No. 3162418, for example, discloses a motorcycle having a folding type rear view mirror with a built-in turn indicator light.

Also it is known to provide a lighting apparatus, in which a main filament and a sub filament are provided for a single light bulb, the main filament being used for a turn indicator light and the sub filament being used for a position light.

In a motorcycle, a position light is provided at a central portion of a vehicle width. The position light therefore does indicate the presence of the vehicle, but it is not sufficient to indicate the vehicle width.

An arrangement may be possible, in which a light bulb provided with a main filament and a sub filament is incorporated in the rear view mirror and, in order to indicate the vehicle width, a position light is turned ON by energizing the sub filament. If the main filament and the sub filament are provided for a single light bulb, however, the light bulb requires replacement when one of the filaments blows off even with the other remaining filament being fully operational. That is, given the same service life for the main and sub filaments, the light bulb offers a service life half that offered by independent light bulbs.

SUMMARY AND OBJECTS OF THE INVENTION

It is therefore an object of the present invention to provide a rear view mirror assembly offering a prolonged substantial service life of the light bulb and capable of enhancing visibility of the vehicle width.

To achieve the foregoing object, a rear view mirror assembly having a mirror housing mounted to a vehicle body according to the present invention is firstly characterized as follows. Specifically, the mirror housing is provided with a mirror installed in a position to face rearwardly relative to the vehicle body and a turn indicator light and a position light installed in a position to face forward relative to the vehicle body.

The present invention is secondly characterized in that a light body of the turn indicator light is a filament light bulb and a light body of the position light is a light emitting diode.

The present invention is thirdly characterized in that the position light remains OFF as long as the turn indicator light flashes OFF and ON for direction indication.

In accordance with the first aspect of the present invention, the position light helps enhance visibility of the vehicle width. In accordance with the second aspect of the present invention, each of the turn indicator light and the position light is provided with an individual light body. This requires replacement of a defective light body only, in case of a malfunction.

In accordance with the third aspect of the present invention, the position light can be turned OFF while the turn indicator light is being used. This allows a flashing operation of the turn indicator light to be easily recognized. In particular, turning OFF the light emitting diode exhibiting a high luminance makes the light emitted by the turn indicator light even more emphasized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
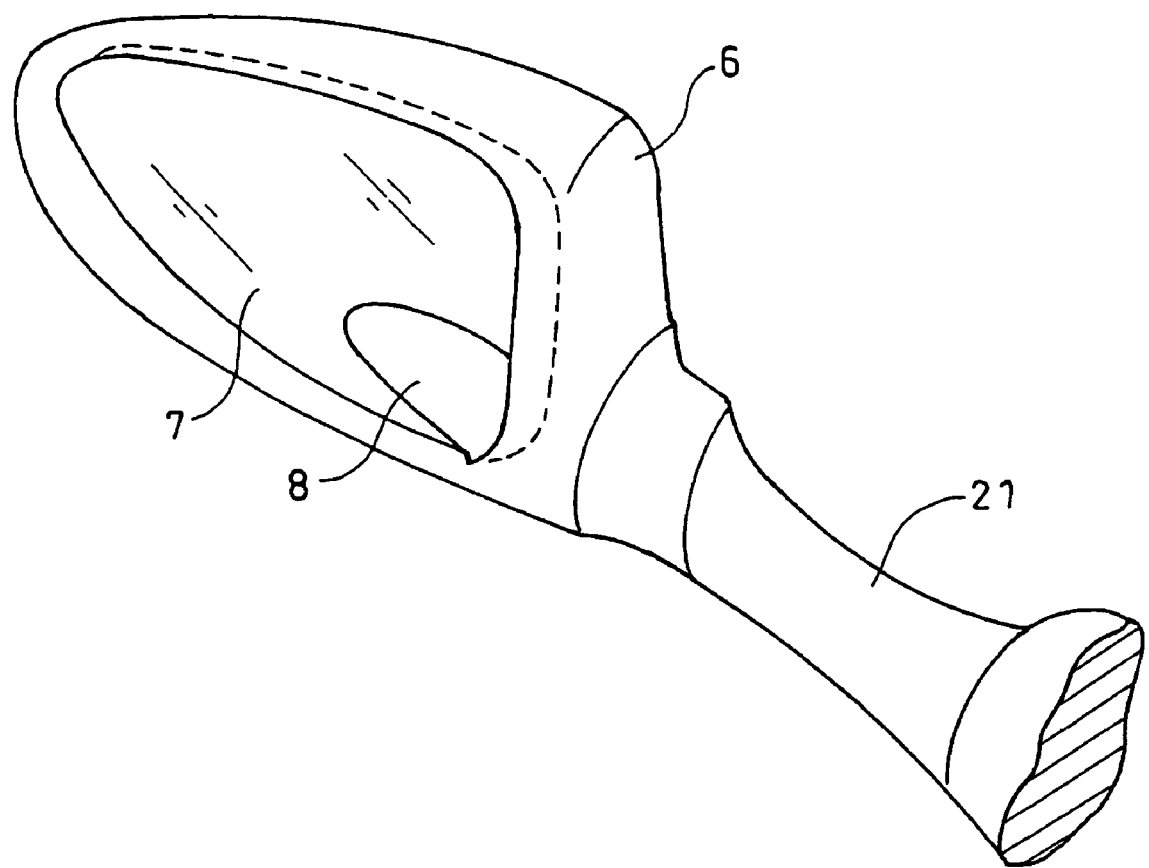
FIG. 1 is a front perspective view showing a rear view mirror assembly according to a preferred embodiment of the present invention.
Figure 2:
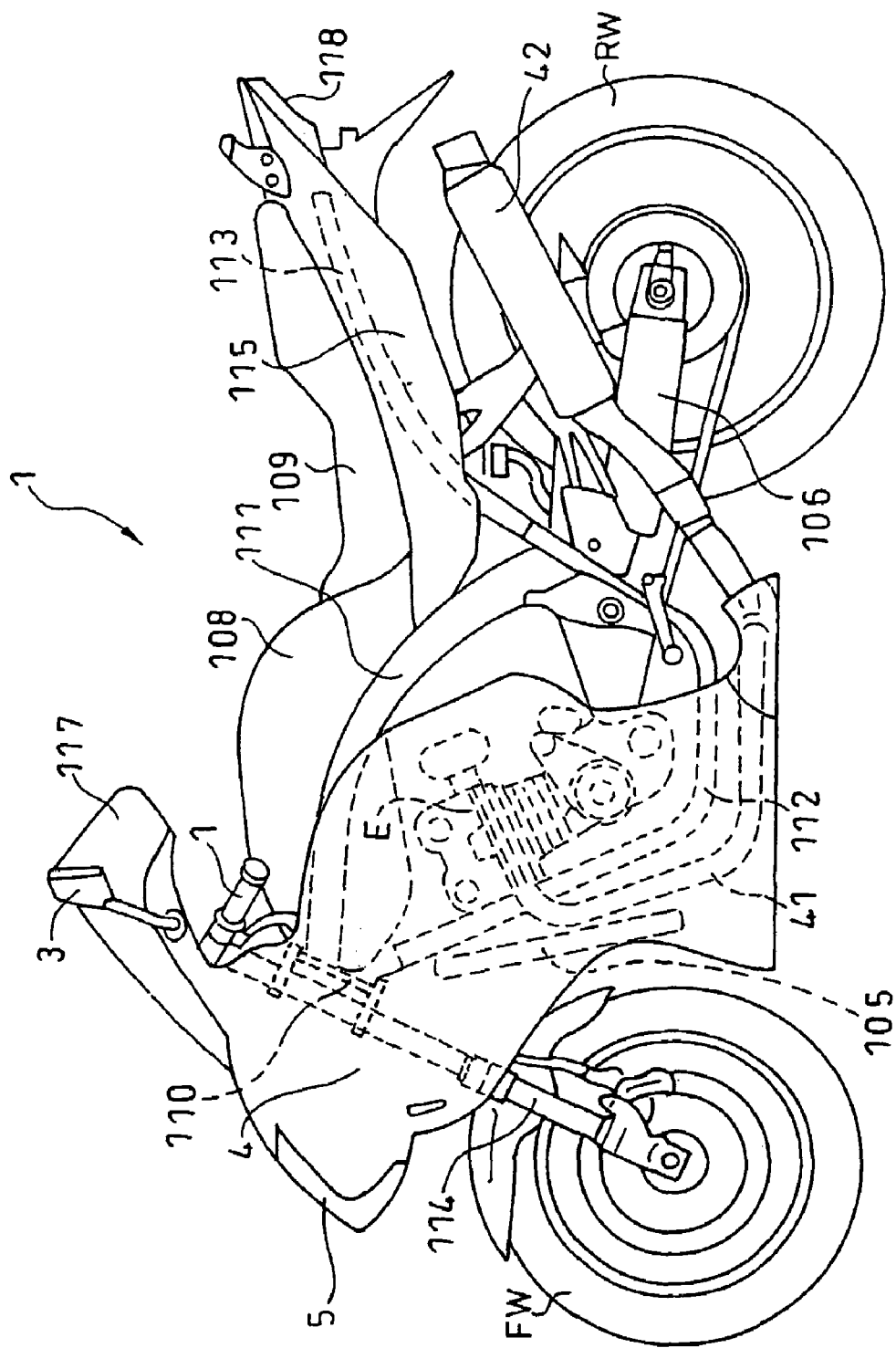
FIG. 2 is a side elevational view showing a motorcycle including a rear view mirror assembly according to the preferred embodiment of the present invention.
Figure 3:
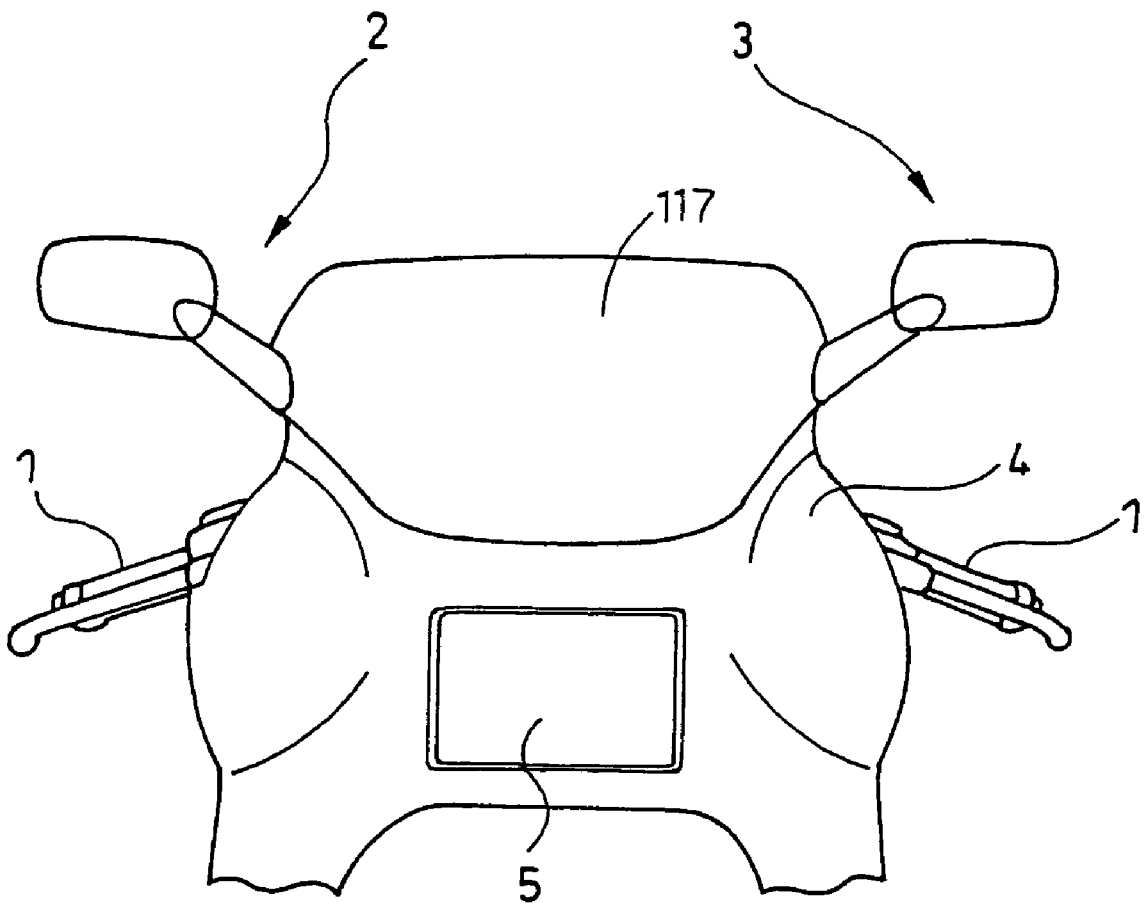
FIG. 3 is a front view showing an essential portion of the motorcycle including a rear view mirror assembly according to the preferred embodiment of the present invention.
Figure 4:
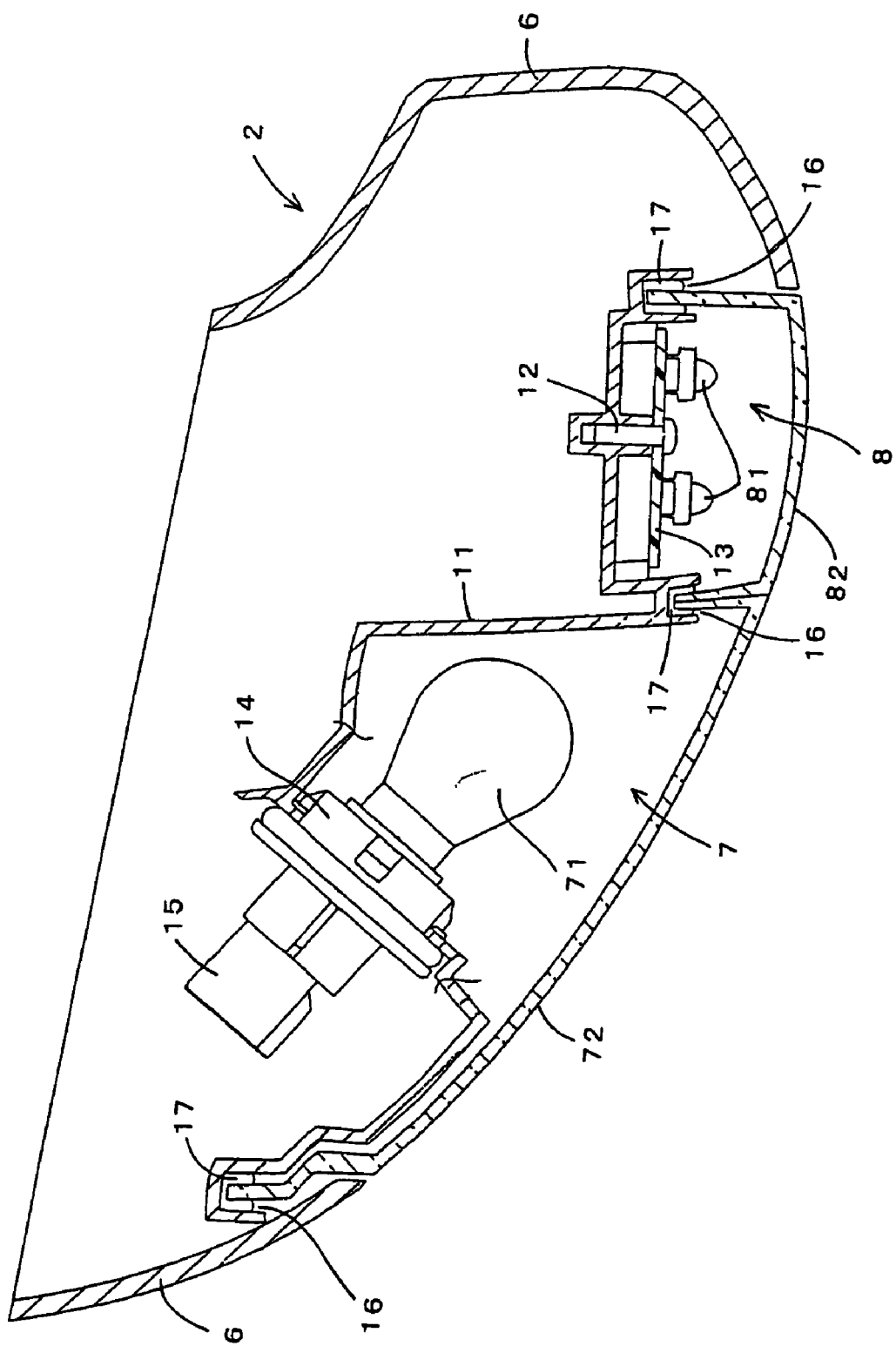
FIG. 4 is a cross-sectional view showing the rear view mirror assembly according to the preferred embodiment of the present invention.

A preferred embodiment of the present invention will be explained with reference to the accompanying drawings. FIG. 2 is a side elevational view showing a motorcycle including a rear view mirror assembly according to the preferred embodiment of the present invention. FIG. 3 is a front view showing an essential portion of the motorcycle. For the purpose of the present invention, terms such as "front," "rear," "forward," "rearward," "left," "right," and the like are used with reference to the vehicle body. Referring to FIGS. 2 and 3, a motorcycle 100 is provided with a body frame comprising the following three components. Specifically, the components are a head pipe 110 located forward of the vehicle body, a main frame 111 extending rearwardly and downwardly from the head pipe 110, and a lower frame 112 having a front end thereof connected to a lower end of the main frame 111 and extending rearwardly. A rear portion of the lower frame 112 is inclined upwardly to form a rear portion frame 113.

A handlebar 1 is provided for a top bridge connected to the head pipe 110. A front fork 114 extending downwardly from the head pipe 110 supports a front wheel FW. An engine E is mounted between the main frame 111 and the lower frame 112. The engine E is a water-cooled four-cylinder engine. A radiator 105 is provided forward the engine E.

A stay 106 extending rearwardly from the body frame supports a rear wheel RW. A power drive from the engine E is transmitted to the rear wheel RW by way of a transmission and a clutch. An exhaust pipe 41 of the engine E extends rearwardly to be connected to a muffler 42. The muffler 42 is provided on both a right side and a left side of the vehicle body.

A fuel tank 108 is provided above the engine E. A seat 109 is located rearwardly of the fuel tank 108 and upwardly of the rear portion frame 113. A portion downward of the seat 109 is covered with a rear portion cover 115. A tail light assembly 118 is mounted in a rear portion of the rear portion cover 115. A cowl 4 covers a front portion of the vehicle body. A headlight 5 is built into a front portion of the cowl 4. A windshield 117 is provided on an upper portion of the cowl 4. Rear view mirror assemblies 2, 3 are disposed on the right and left of the windshield 117.

The construction of the rear view mirror assemblies 2, 3 will be described in details. The rear view mirror assemblies 2, 3 are disposed symmetrically about the vehicle body. The description that follows is concerned with the rear view mirror assembly 2 on the right-hand side of the vehicle body. As illustrated in FIGS. 1 and 3–5 an arm 21 is mounted on the handlebar 1 and is provided with a mirror housing 6. A turn indicator light 7 and a position light 8 are provided on a back surface of the mirror housing 6, more specifically, on the face of the mirror housing 6 facing forward of the vehicle body.

A base 11 is provided inside the mirror housing 6, which is secured to the mirror housing 6 using screws 9, 10. One set of two different types of light bodies is mounted on the base 11. One of the light bodies is a filament light bulb 71 used for the turn indicator light 7, the other of the light bodies is a light emitting diode (LED) 81 used for the position light 8. The LED 81 is mounted on a board 13 secured to the base 11 using a screw 12. It is preferable that a plurality of LEDs 81 (two according to this embodiment) are provided. The light bulb 71 is inserted into a holder 14 secured to the base 11. Electricity is supplied to the light bulb 71 from a battery, not shown, through a coupler 15. The wall surface of the base 11, sectioned for the light bulb 71 is disposed on, forms a reflector surface reflecting light from the light bulb 71 forward.

A front portion of the light bulb 71 and that of the LED 81 are covered with a lens 72 and a lens 82, respectively. The lenses 72, 82 are fitted into grooves 16 formed in the base 11. Sealing members 17 are arranged in the grooves 16. The lens 72, which is larger than the lens 82, is shaped so as to encompass a substantial part of a periphery of the lens 82 used for the position light and disposed more on the center of the vehicle body.

Figure 5:
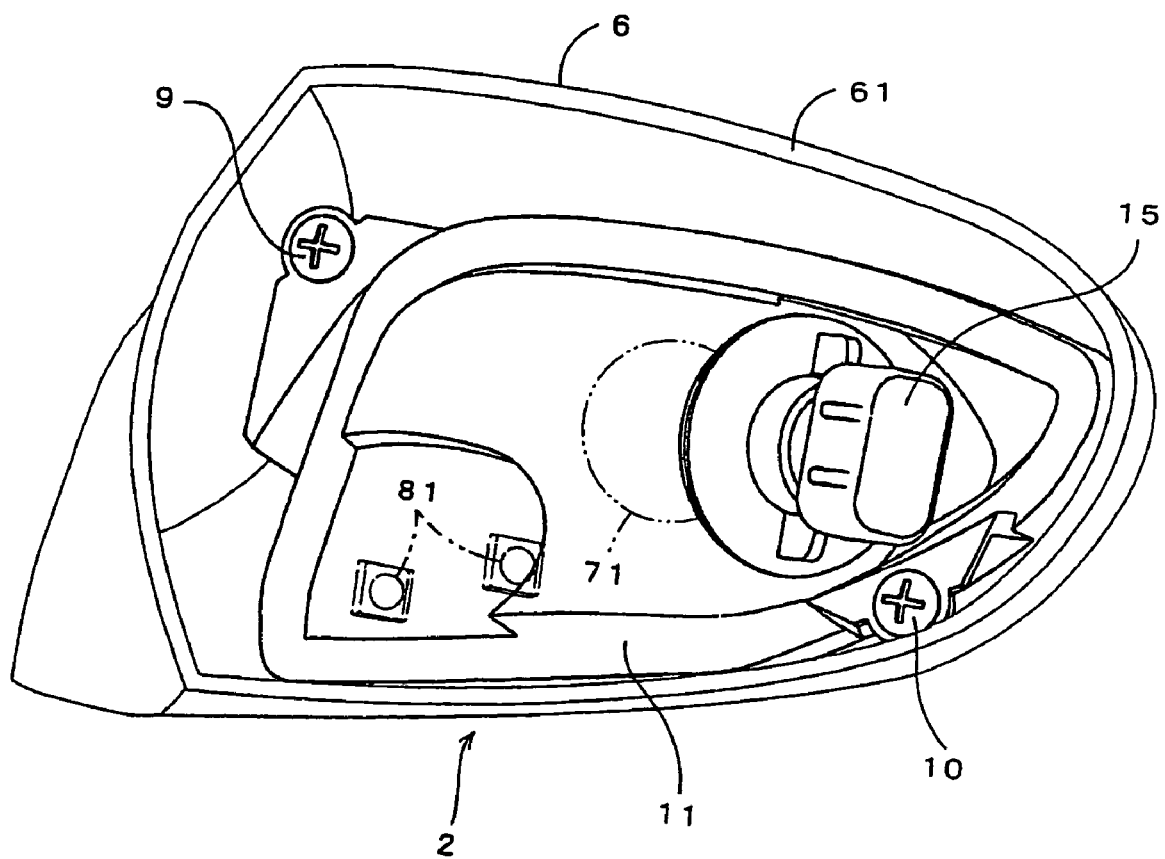
FIG. 5 is a rear perspective view showing the rear view mirror assembly according to the preferred embodiment of the present invention.

FIG. 5 is the rear perspective view showing the rear view mirror assembly 2 with the mirror removed. The mirror not shown is fitted into an inside of a peripheral edge 61 in the mirror housing 6.

In the motorcycle provided with the rear view mirror assembly constructed as described in the foregoing, the headlight 5 and the position light 8 are turned ON during ordinary running conditions and when the motorcycle is pulled up. When a rider of the motorcycle gives a direction indication as he or she attempts to make a right or left, the turn indicator light 7 flashes OFF and ON, during which time the position light 8 is kept OFF.

As described in the foregoing, the position lights 8 are provided in the rear view mirror assemblies jutting out on the right and left of the vehicle body. This enhances visibility of the vehicle width. Further, the turn indicator light 7 and the position light 8 are formed in respective individual light bodies. In case of failure, it is therefore necessary to replace only the defective light body. This means that each light body can be used up to its full service life.

As evident from the foregoing description, the motorcycle provided with the rear view mirror assembly allows the vehicle width to be easily recognized by means of the position light provided therein. The rear view mirror assembly is economical, since it is necessary to replace only the defective light body, in case of a failure. In addition, since the position light is kept OFF while the turn indicator light flashes OFF and ON for direction indication, the direction indication is easily recognizable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear view mirror assembly comprising:
   a mirror housing adapted for mounting on a vehicle body;
   a mirror mounted to face rearwardly on the vehicle body; and
   a turn indicator light and a separate position light mounted in the housing in positions separate from the mirror and projecting light outwardly from the vehicle body in a forward direction, said mirror housing including:
   a first lens for covering said turn indicator light for enabling illumination therethrough; and
   a second lens for covering said position light for enabling illumination therethrough,
   wherein the first lens is larger than the second lens, and
   wherein a side of the first lens abuts against a side of the second lens so that a substantial part of peripheries of the first and second lenses adjoin each other.

2. The rear view mirror assembly according to claim 1, wherein a light body of said turn indicator light is a filament light bulb and a light body of said position light is a light emitting diode, wherein the filament light bulb is mounted at an acute angle with respect to a longitudinal direction of the vehicle body, the vehicle body being on a two-wheeled motor vehicle.

3. The rear view mirror assembly according to claim 1, wherein said position light is kept OFF while said turn indicator light is flashing OFF and ON for direction indication.

4. The rear view mirror assembly according to claim 2, wherein said position light is kept OFF while said turn indicator light is flashing OFF and ON for direction indication.

5. The rear view mirror assembly according to claim 2, wherein a plurality of said light emitting diodes is provided for providing illumination.

6. The rear view mirror assembly according to claim 1, and further including a base member for mounting the turn indicator light and the separate position light within the mirror housing, wherein the base is disposed on a forward side of the mirror housing and the mirror is disposed on a rearward side of the mirror housing.

7. The rear view mirror assembly according to claim 6, wherein the base includes a wall surface disposed between the turn indicator light and the separate position light, said wall surface forming a reflector surface reflecting light from the turn indicator light forwardly.

8. The rear view mirror assembly according to claim 1, wherein the first lens is provided for covering said turn indicator light and the separate position light, and further including a sealing member operatively mounted between the mirror housing and the first lens for providing a water tight closure.

9. A rear view mirror assembly comprising:
a mirror housing having a forward surface and a rearward surface;
a mirror mounted relative to said rearward surface of the mirror housing for viewing in a rearward direction; and
a turn indicator light and a separate position light mounted relative to said forward surface of the mirror housing for selectively providing illumination out of the mirror housing in a forward direction, the mirror and the lights being separate from each other, said mirror housing including:
a first lens for covering said turn indicator light for enabling illumination therethrough;
a second lens for covering said position light for enabling illumination therethrough; and
a base attached to the mirror housing,
wherein the first lens is larger than the second lens and
wherein a side of the first lens and a side of the second lens fit into a common groove that a substantial part of peripheries of the first and the second lenses adjoin each other.

10. The rear view mirror assembly according to claim 9, wherein a light body of said turn indicator light is a filament light bulb and a light body of said position light is a light emitting diode, wherein the filament light bulb is mounted at an acute angle with respect to a mirror surface longitudinal direction of the vehicle body, the vehicle body being on a two-wheeled motor vehicle.

11. The rear view mirror assembly according to claim 9, wherein said position light is kept OFF while said turn indicator light is flashing OFF and ON for direction indication.

12. The rear view mirror assembly according to claim 10, wherein said position light is kept OFF while said turn indicator light is flashing OFF and ON for direction indication.

13. The rear view mirror assembly according to claim 10, wherein a plurality of said light emitting diodes is provided for providing illumination.

14. The rear view mirror assembly according to claim 9, wherein the turn indicator light and the separate position light are mounted on the base within the mirror housing.

15. The rear view mirror assembly according to claim 14, wherein the base includes a wall surface disposed between the turn indicator light and the separate position light, said wall surface forming a reflector surface reflecting light from the turn indicator light forwardly.

16. The rear view mirror assembly according to claim 9, wherein the first lens is provided for covering said turn indicator light and the separate position light, and further including a sealing member operatively mounted between the mirror housing and the first lens for providing a water tight closure.

17. The rear view mirror assembly according to claim 1, and since the peripheries of the first and second lenses adjoin each other, the illumination from the turn indicator light is able to pass through the second lens.

18. The rear view mirror assembly according to claim 1, wherein the illumination from the turn indicator light is able to pass through both the first lens and the second lens.

19. The rear view mirror assembly according to claim 9, and since the peripheries of the first and second lenses adjoin each other, the illumination from the turn indicator light is able to pass through the second lens.

20. The rear view mirror assembly according to claim 9, wherein the illumination from the turn indicator light is able to pass through both the first lens and the second lens.

* * * * *